United States Patent [19]

Dahl

[11] Patent Number: 5,228,716

[45] Date of Patent: Jul. 20, 1993

[54] CONVERTIBLE TRANSPORT CART

[76] Inventor: Gary-Michael Dahl, 8300 Sands Pointe Dr. #903, Houston, Tex. 77036

[21] Appl. No.: 762,568

[22] Filed: Sep. 17, 1991

[51] Int. Cl.⁵ .......................................... B62B 3/02
[52] U.S. Cl. ............................. 280/651; 280/47.18; 280/47.29; 280/47.34
[58] Field of Search ................ 280/47.18, 47.29, 655, 280/655.1, 651, 638, 35, 47.27, 47.34, 47.2

[56] References Cited

U.S. PATENT DOCUMENTS

| | | |
|---|---|---|
| 1,662,730 | 3/1928 | Wertenberger . |
| 2,263,879 | 11/1941 | Jorgensen .......................... 280/5.24 |
| 2,519,113 | 8/1950 | Cohn .................................... 280/49 |
| 2,620,041 | 12/1952 | Chenette ............................. 180/9.1 |
| 2,820,643 | 1/1958 | Cohn .................................... 280/34 |
| 3,104,890 | 8/1963 | Hill ...................................... 280/34 |
| 3,206,790 | 9/1965 | Romay ................................ 16/35 |
| 3,423,103 | 1/1969 | Maltarp .......................... 280/655.1 |
| 3,759,538 | 9/1973 | Fabiano ........................... 280/47.35 |
| 3,761,107 | 9/1973 | Doeherty ........................... 280/348 |
| 3,837,667 | 9/1974 | Sernovitz ....................... 280/47.34 |
| 4,009,891 | 3/1977 | Jensen .................................. 280/657 |
| 4,448,440 | 5/1984 | Gier .................................... 280/655 |
| 4,637,626 | 1/1987 | Foss ..................................... 280/655 |
| 4,717,168 | 1/1988 | Moon, Sr. ........................... 280/641 |
| 4,796,909 | 1/1989 | Kirkendall ......................... 280/651 |
| 4,902,027 | 2/1990 | Skelly ............................. 280/33.998 |

FOREIGN PATENT DOCUMENTS 294294A 12/1988 European Pat. Off. .

Primary Examiner—Margaret A. Focarino
Assistant Examiner—Michael Mar
Attorney, Agent, or Firm—Harrison & Egbert

[57] ABSTRACT

A convertible cart for transporting objects having a frame, a first handle connected to the frame, a second handle connected adjacent an opposite end of the frame, a pair of primary wheels attached to the frame, and at least one secondary wheel attached to an opposite end of the frame. Each of the handles is selectively movable between a first position generally perpendicular to the frame and a second position generally aligned with the frame. The primary wheels and secondary wheel support the frame at a position parallel to the surface on which the wheels are placed. A locking mechanism is provided for the handles which includes a first and second axle members extending inwardly on opposite sides of the frame, a first stop member fastened to the frame so as to abut a surface of the handle, and a cord extending across the handle so as to cause the handle to move along a slide surface of the axle members.

11 Claims, 3 Drawing Sheets

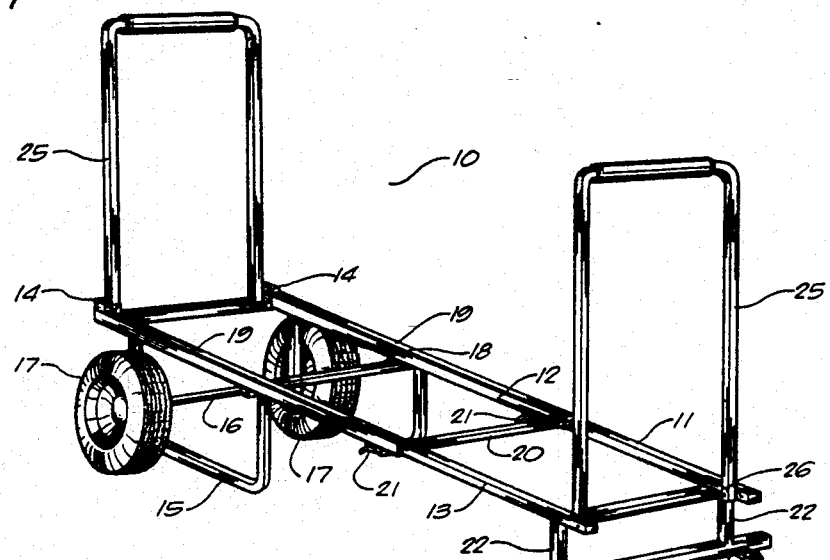
FIG. 1
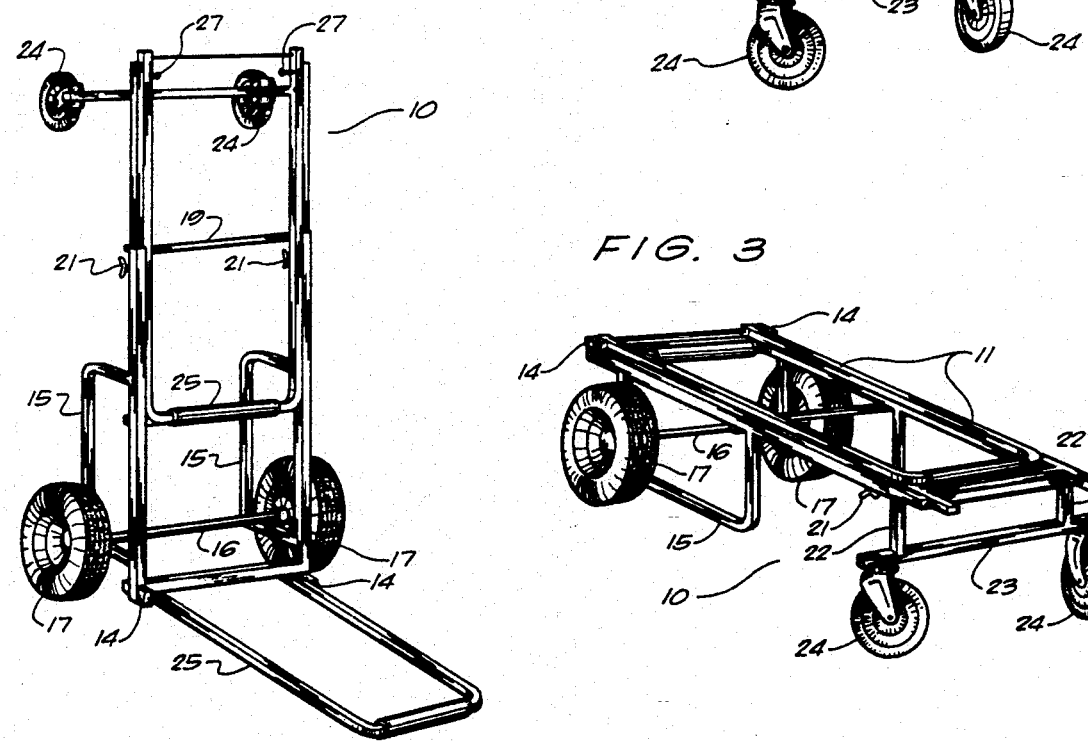
FIG. 2
FIG. 3

CONVERTIBLE TRANSPORT CART

TECHNICAL FIELD

The present invention relates to hand trucks, dollies, and other land vehicles. More particularly, the present invention relates to lightweight, telescoping foldable and convertible hand trucks and/or platform carts which are used for transporting objects.

BACKGROUND ART

Many improvements have been made in the area of hand trucks and dollies for material handling. However, none of these improvements have efficiently and effectively addressed the needs of professional musicians. Professional musicians are required to transport wide varieties of musical instruments and related gear often utilizing small cars and trucks over various terrains and changing environments while travelling to and from performance sites. Due to the virtual explosion in technology over the last ten years regarding P.A. systems, electronic keyboards, effects and the like, musical groups require more equipment than ever before. The problems of transporting the above-mentioned equipment have become increasingly difficult. It is desirable to create a specialized dolly or cart that can satisfy the criteria of musicians.

In the past few years, mini-vans have been placed in common use for the transport of musical and other equipment. As such, space limitations have become of great concern to musicians. Any transport carts must now have a size which can carry large loads yet collapse to a small storage size so as to leave maximum room for equipment with the mini-van. Space is at a premium within a mini-van.

Initially, it is desirable to produce a lightweight cart weighing under thirty-five pounds. It has been found that professional musicians experience finger stiffening and muscle stiffening in the hands and forearms when lifting objects over forty pounds which is deleterious to musical performance. In addition, the carrying of heavy equipment can contribute to back problems and related physical impairment. In addition, it also tights laryngeal muscles and, thus, hampers singing performance.

When transporting musical equipment, any cart or dolly should be capable of supporting five hundred pounds or more. Musical equipment is delicate and should be transported smoothly and without shock. In addition, the musical equipment should be properly supported and handled with care. Any handtruck or dolly must be able to reduce to a size of three feet of length or less so as to facilitate receipt in small car trucks and/or baggage handling in airports.

In order to effectively accommodate keyboards and large P.A. cabinets, a cart must have the ability to extend to approximately fifty-four inches. It should also be short enough to maneuver through labrinyth-like corridors and elevators, often found in hotels and stage areas. Support should be provided on each end of the cart so as to maintain the expensive and delicate equipment within the confines of the frame of the dolly. Tall foldable sides can be useful for securing equipment such as drums, guitars, horns and the like, as well as acting as a hanger for various stage clothes.

Since the equipment must be transported over various terrains, the cart should have the quality suitable for rolling smoothly and shock-free over such various terrains. The wheeled mechanism of the dolly or cart should be suitable for traversing curbs, stairs, grass, dirt and rough pavement. The cart should provide a broad frame surface so as to easily receive the musical equipment. A non-skid surface is useful in order to prevent odd-shaped instruments and widely-used polyethylene cases (which are notoriously slippery) from slipping and falling off during transport. The cart should be able to be converted from a two-wheel hand truce to a four-wheel cart both extremely quickly and efficiently. Since the cart must be loaded and unloaded often during a musical performance, complete assembly into loading configuration should be completed within seven seconds.

It is often the requirement of musicians that they must set up extremely quickly and must break down the equipment quickly. As such, it is a requirement for a musical instrument transport cart that the cart be able to be assembled into its proper position for receiving equipment both quickly and easily. Undue manipulation of screws, nuts, bolts, and other items wastes a great deal of time and is generally unsuitable for the purposes of the musician. A musical instrument transport cart must be capable of rapid assembly. The cart should also be capable of assuming any configurations within seven seconds or less.

A caster brake is necessary so as to allow the cart to be retained on uneven surfaces.

It is also important for musical equipment to be maintained on a surface parallel to the surface on which the cart is travelling. As such, the frame of the cart should be supported on wheels which maintain the frame in parallel relationship to the earth. Any angling of the frame will tend to cause the equipment to move to the lowest end of the cart. The angling may also cause excessive and unexpected pressures to be applied to cart components. In order to enhance the ability to maintain the parallelism of the cart to the surface, the handle should be foldable in such a way so as to maintain this parallelism.

Various patents have issued in the past which deal with various types of collapsible hand trucks and dollies. U.S. Pat. No. 1,662,730, issued on Mar. 13, 1928, to Wertenberger et al. shows a stylized truck having a broad surface with suitable caster wheels for transporting bathtubs. U.S. Pat. No. 2,519,113, issued on Aug. 15, 1950, to L. I. Cohn shows a hand truck having a collapsible handle at one end, a stair climbing apparatus, and an adjustable frame. U.S. Pat. No. 2,620,041, issued on Dec. 2, 1952, to Chenette et al. shows a truck having a treaded stair climbing attachment. U.S. Pat. No. 2,820,643, issued on Jan. 21, 1958, to L. I. Cohn shows a hand truck and dolly having an adjustable handle for converting the truck into a dolly. U.S. Pat. No. 3,104,890, issued on Sep. 24, 1963, to N. Hill shows a utility cart having telescoping tubular frame members U.S Pat. No. 3,206,790 issued on Sep. 21, 1965, to C. Romay describes a locking assembly for a swiveled caster as used on trucks and other carts. U.S. Pat. No. 3,759,538, issued on Sep. 18, 1973, to A. J. Fabiano illustrates a mobile storage facility having wheels and handles for supporting a tray for garden implements, accessories, and supplies. U.S. Pat. No. 3,761,107, issued on Sep. 25, 1973 to Dochery et al shows an adjustable dolly for supporting furniture thereon. U.S. Pat. No. 3,837,667, issued on Sep. 24, 1974, to M. A. Sernovitz shows an open-framed cart for receiving containers stacked in a nested relationship. U.S. Pat. No. 4,009,891, issued on Mar. 1, 1977, to O. Jensen provides a hand truck and dolly with an adjustable frame and support chassis. U.S. Pat. No. 4,448,440, issued on May 15, 1984, to R. H. Gier discloses a hand truck having a load supporting platform pivotted to swing from an operative position to a position flush against the frame. U.S. Pat. No. 4,637,626, issued on Jan. 20, 1987, to Foss et al. shows a portable, foldable and convertible luggage trolley. U.S. Pat. No. 4,717,168, issued on Jan. 5, 1988, to J. R. Moon discloses a utility cart having a pair of balloon tire wheels supporting a frame counterbalanced for easy pushing. A pair of caster wheels are provided on the front of the inclined frame. U.S. Pat. No. 4,796,909, issued on Jan. 10, 1989, to V. S. Kirkendall describes a four wheeled pull-type service cart designed to transport heavy loads over sandy terrain. European Patent No. 294,249 shows a dolly having a detachable tubular structure which provides an extendible platform.

It is an object of the present invention to provide a convertible cart designed to be use in combination with the transport of musical equipment.

It is an object to provide a cart that will carry up to five hundred pounds, will extend to fifty-four inches in length, weigh less than thirty-five pounds, and collapse to thirty-six inches in length for storage, be durable, and be relatively inexpensive.

It is another object of the present invention to provide a telescoping and collapsible cart for easy storage.

It is another object of the present invention to provide foldable handles having a sufficient height to allow for efficient stacking and carrying of delicate musical equipment as well as for allowing for easy storage.

It is a further object of the present invention to provide a locking mechanism for the handles of a cart which allows the handles to be positioned within one second each.

It is a further object of the present invention to provide a cart having handles and a frame that can be arranged so as to maintain a parallel relationship with the earth.

It is still a further object of the present invention to provide a cart that can be easily transported through airports and the like by having a folded length of three feet or less and a flat side for airport transport belts.

It is another object to provide a cart that has minimal protrusions for the prevention of snagging, scraping, and injury.

These and other objects and advantages of the present invention will become apparent from a reading of the attached specification and appended claims.

SUMMARY OF THE INVENTION

The present invention is a convertible cart for transporting objects which comprises a frame, a first handle connected to the frame adjacent one end of the frame, a second handle connected to the opposite end of the frame from the first handle, a pair of primary wheels attached to one end of the frame, and at least one secondary wheel attached to the opposite end of the frame. Each of the first and second handles is selectively movable between a first position generally perpendicular to the frame and a second position aligned with the frame. The wheels support the frame in a position parallel to the surface on which the wheels are placed.

The frame comprises a first U-shaped member and a second U-shaped member slidably engaging the first U-shaped member. The first and second U-shaped members are movable relative to each other for changing a length of the frame. A locking member is fastened to one of the U-shaped members so as to selectively engage the other of the U-shaped members. Specifically, a thumbnut is threadedly fastened to one of the U-shaped members on an underside of the frame. This thumbnut is rotatable to a position in abutment with the other of the U-shaped members.

The frame has a first stop member fastened to the frame adjacent to the first handle. The frame also has a second stop member fastened to the frame adjacent to the second handle. The first and second stop members are in abutment with the first and second handles when the handles are in the first position. The frame has a first axle member in engagement with the first handle. A second axle member is also connected to the frame for engagement with the second handle. The first handle is rotated between the first and second positions about this first axle member. The second handle is rotatable between the first and second positions about the second axle member. These axle members extend inwardy from the frame. Each of the axle members has a slide surface which allows the handle to slide longitudinally thereacross. Each of the first and second handles has a U-shaped configuration. A flexible cord extends between the ends of the handle so as to allow the handles to slide on the axle members.

The pair of primary wheels are pneumatic wheels. The secondary wheels are two pivoting caster wheels provided on opposite sides of one end of the frame. A lock is provided for selectively preventing rotation of the caster wheels.

A stair climber frame member is fastened to an underside of the frame adjacent to the primary wheels.

BRIEF DESCRIPTION OF THE DRAWINGS

FIG. 1 is a perspective view of the present invention illustrating the expanded operable position for use as a dolly.

FIG. 2 is a perspective view of the present invention illustrating the configuration of the present invention as a two wheeled hand truck.

FIG. 3 is a perspective view of the present invention showing the handles in their collapsed position.

DETAILED DESCRIPTION OF THE INVENTION

Figure 4:
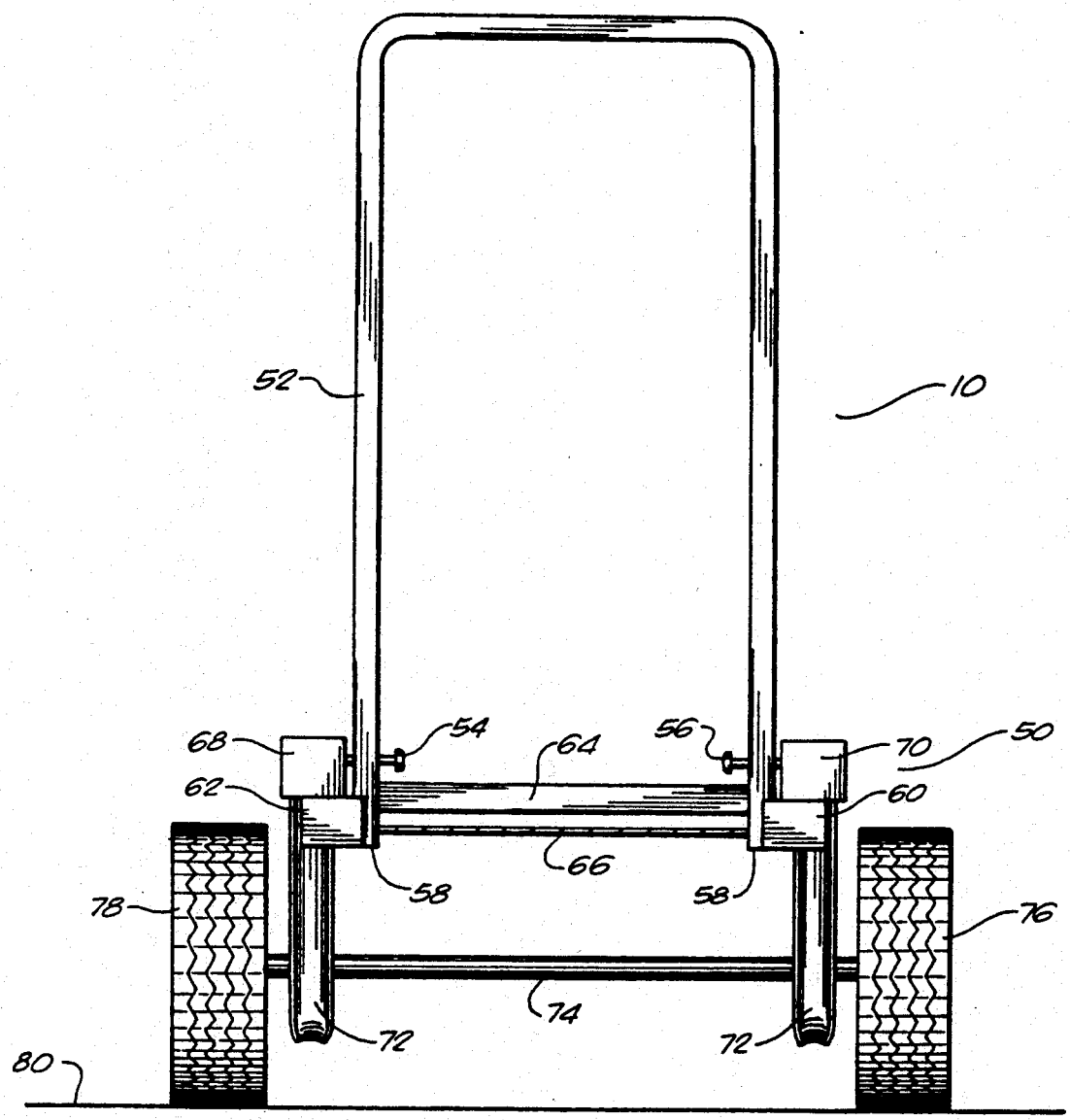
FIG. 4 is an end view of the cart of the present invention showing, in particular, the configuration of the locking mechanism.

With reference to the drawings, FIG. 1 illustrates the present invention in its fully extended position. The frame 11 of cart 10 is made of preferably a mild square tubular steel which is structurally light. The frame 11 is comprised of slidably cooperating U-shaped square tubing divided into two sections. The main frame bed 12 and the telescoping frame section 13 are provided so as to form the frame 11. Telescoping frame section 13 slidably engages the main frame 12. The frame 11 may be welded or bonded by mechanical means such as by bolts 14. The main frame bed 12 includes a non-skid surface 19 for reduced possibility of accidental slipping of equipment.

A stair climber attachment 15 is secured to the lower end of the main frame bed 12. The stair climber attachment 15 includes axle 16 for supporting two primary pneumatic wheels 17 and also serving as a lateral support bar 18 for bracing the main frame bed 12. Another lateral support bar 20 is placed where the telescoping frame section 13 and the main frame bed interconnect. This reinforces the mid-section of the frame 11. Additional reinforcement is provided by the use of heavy duty thumbnuts 21. The thumbnuts 21 are threadedly received on the underside of main frame bed 12 on each side of the frame bed. Thumbnuts 21 can be rotated so as to move in abutment with the telescoping frame section 13. This serves to lock the telescoping frame section 13 in position relative to the main frame bed 12. The thumbnuts 21 are located on the underside of the main frame bed 12 so as to avoid snagging of equipment or objects located on the top or sides of the cart 10.

A brace 22 extends down from and is attached to the front or top end of the telescoping frame section 13. Brace 22 is of a suitable size to serve as a support 23 for the secondary wheels 24. Secondary wheels 24 are preferably pivotting casters for ease in direction change. Brace 22, in combination with secondary wheels 24, allows for uniform balance of the front and back of cart 10.

Inverted U-shaped equipment support handles 25 are symmetrically placed on opposite ends of frame 25. The equipment support handles 25 are releasably attached to the frame by suitable hinges 26 for ease in collapsing equipment support handles 25. The handles 25 are also locked into place by suitable mechanical means, to be described hereinafter in conjunction with FIGS. 4-6.

Each of the handles 25 is supported on axle members 27. Handles 25 can rotate about axles 27 from a first position to a second position. The first position of handles 25 is illustrated in FIG. 1. Handles 25 are in a position perpendicular to the frame 11 of cart 10. The second position of handles 25 is shown in FIG. 3 in which the handles 25 are rotated about axles 27 so as to assume a position parallel to and aligned with the frame 11. The ability to rotate the handles 25 about axles 27 enhances the capabilities of the present invention. A specialized mechanism is provided for locking the handles in proper position.

In FIG. 2, it can be seen that the handle 25 is rotated about axles 27 so as to be coplanar with the frame 11. The handle 25 is contained within the perimeter formed by frame 11. The other handle 25 is placed in its first position perpendicular to the frame 11. In the position illustrated in FIG. 2, the cart 10 assumes a hand truck configuration.

FIG. 3 illustrates the cart 10 in its configuration as a four-wheel flatbed cart. In FIG. 3, the handles 25 are both rotated about axles 27 so as to be placed in their second position. The second position is a flat position on the frame 11. It can be seen that one handle 25 is received within the area of frame 11 and is generally coplanar with the area of frame 11. The other handle 25 is hinged to axles 27 slightly above the top surface of frame 11. This causes the other handle 25 to assume a position juxtaposed against the top surface of frame 11 and arranged parallel to frame 11. In either of the configurations, the top surface of the cart 10 of the present invention will be flat and parallel to the surface upon which the cart 10 rests.

The stair climber attachment 15 supports the frame 11 a distance above pneumatic wheels 17. Similarly, the brace 22 and the support 23 supports the frame 11 a distance above the caster wheels 24. It is important to the embodiment of the present invention that the frame 11 be supported so as to be parallel above the surface upon which the cart 10 rests. As such, the structural members are configured so as to provide this levelling of the frame 11 above the wheels. The primary wheels 17 are positioned on opposite sides of frame 11. Similarly, the caster wheels 24 are placed on opposite sides of frame 11. The pneumatic wheels 17 allow the cart 10 to be moved along various types of terrain. The pneumatic wheels 17 allow the cart to be moved without shock to the contents on the frame 11. The wheels 17 can be inflated to any desired pressure.

The use of the mild durable square tubular steel material is, by structural design, light enough in weight to be manually lifted onto a truck or into an automobile trunk. It is also structurally sound enough to withstand and support as much as 500 pounds of equipment. The overall empty weight of the cart 10 should not exceed forty pounds. The square tubular steel is preferred because it allows for a larger surface area on the frame 11 than does rounded tubing. Non-skid adhesive tape, or the like, is applied to the top surface of the main frame bed 12 so as to reduce the possibility of equipment slipping from the cart.

The telescoping frame 11 allows for compact storage when the cart 10 is not in use. This is important given the limited space often available to musicians. The cart achieves maximum hauling capacity when the frame 11 is fully extended. The ends of the cart 10 are designed to be bilaterally symmetrical and are of sufficient height to allow for efficient stacking of musical equipment. The ends releasably collapse to the frame 11 for convenient storage. Foamed handles may be provided on the top of handles 25 for the comfort of the user.

The stair climbing device 15 is attached to the bottom of the cart 10 to aid in ascending and descending stairs. The primary wheels 17 are located at the bottom end of the cart and use part of the stair climbing device as an axle. These primary wheels are preferably pneumatic for a smooth ride on rough terrain. The secondary wheels 24 are located on the opposite end of the cart and are preferably pivotting caster wheels for ease and direction change and maneuverability.

The lateral support bars 18 and 20 are placed perpendicular in the frame to help support equipment and reinforce the structural stability of the frame 11. The frame 11 is actually made of two separate pieces, the main frame bed 12 and the telescoping frame bed 13. The attachment of telescoping frame section 13 to the main frame bed 12 is further enhanced by the use of the heavy-duty thumbnut which affixes the sections in position relative to each other.

FIG. 4 shows an end view of the cart 10 of the present invention. FIG. 4 illustrates, in particular, the configuration of the looking mechanism 50 in accordance with the preferred embodiment of the present invention. As can be seen in FIG. 4, cart 10 includes inverted U-shaped handle 52 which is rotatably connected to axle members 54 and 56. The ends 58 of handle 52 rest in abutment against a first stop member 60 and a second stop member 62. The other side of the ends 58 of handle 52 are in abutment with crossbar 64. In this position, the handle 52 is supported in a rigid upright position. The ends 58 cannot move because of their abutment with stop members 60 and 62 and with crossbar 64. A cord 66 is fastened adjacent to the ends 58 of handle 52 and extends between the ends 58 in generally close proximity to the axle members 54 and 56 and near the stop members 60 and 62.

The first axle member 54 is rigidly affixed in position and extends inwardly from frame portion 68. Similarly, the second axle member 56 is rigidly supported by and extends inwardly from the frame portion 70. Frame portions 68 and 70 are supported by the stair climber attachment 72. Wheel axle 74 extends beneath the frame portions 68 and 70 and is received by the stair climber attachment 72. Wheel axle 74 rotatably supports the pneumatic wheels 76 and 78. Wheels 76 and 78 rest on surface 80. It can be seen that the frame of cart 10 resides parallel to the surface 80 when the cart is in the position illustrated in FIG. 4.

Figure 5:
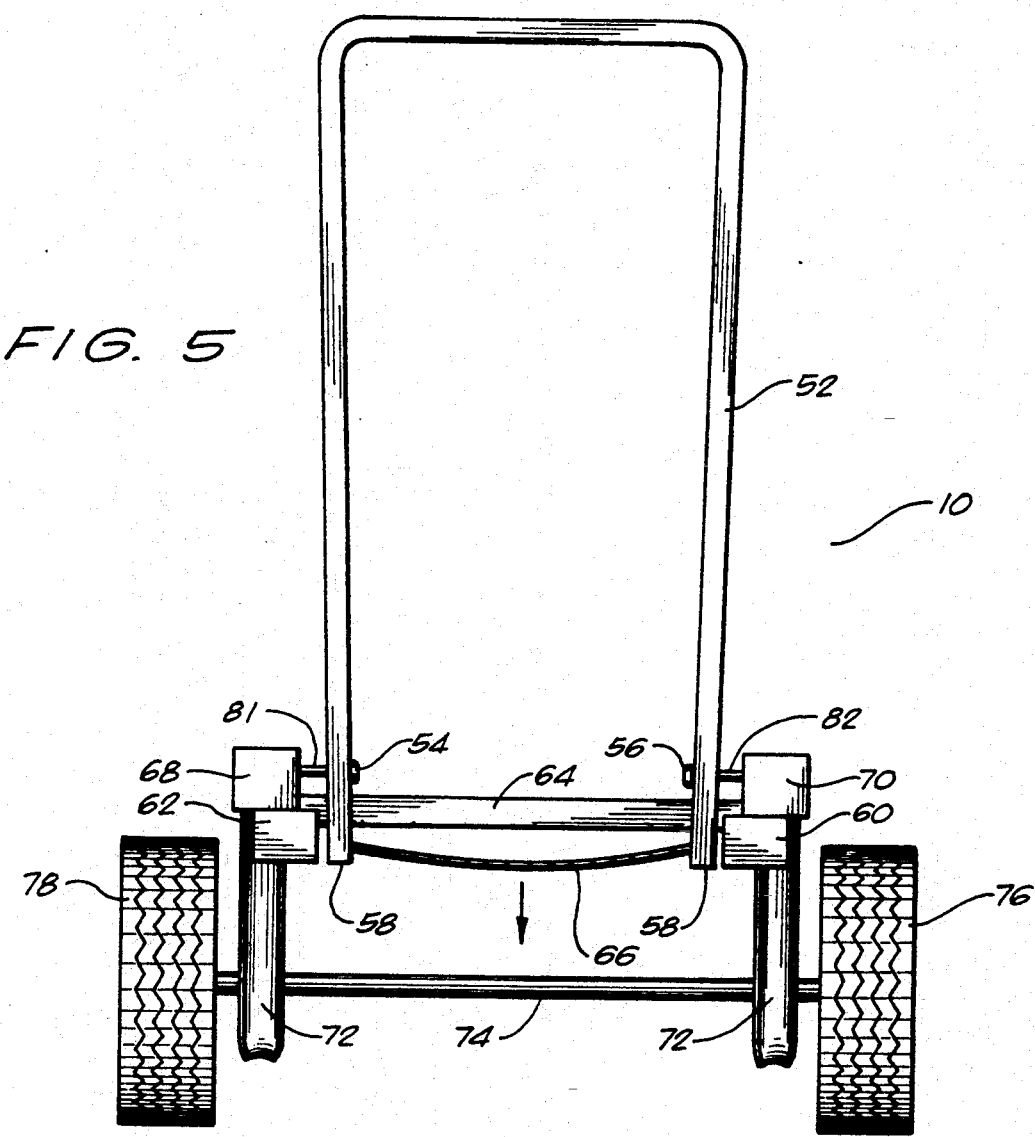
FIG. 5 is an end view similar to FIG. 4 showing, in particular, the workings of the locking mechanism.

FIG. 5 illustrates how the locking mechanism of the present invention actually operates so as to allow the handle 52 to move from its first perpendicular position to its position in alignment with the frame of cart 10. As can be seen in FIG. 5, a pressure is applied, either upwardly or downwardly to the cord 66. The application of a downward pressure to cord 66 causes the ends 58 of handle 52 to move inwardly toward each other. Additionally, this allows the handle 72 to move inwardly along the slide portion 81 of first axle member 54 and to slide inwardly along the slide surface 82 of second axle member 56. The slide surfaces 81 and 82 extend longitudinally along the axle members 54 and 56, respectively.

This movement causes the ends 58 to become clear of the stop members 60 and 62. It can be seen that the stop members 60 and 62 have a width that is less than the length of the slide surfaces 81 and 82 of axle members 54 and 56. After the ends 58 have cleared the stop members 60 and 62, the handle 52 is free to rotate about axle members 54 and 56. When the handle 52 lies flat against the frame, the cord 66 is released so that the ends return to their original position.

Figure 6:
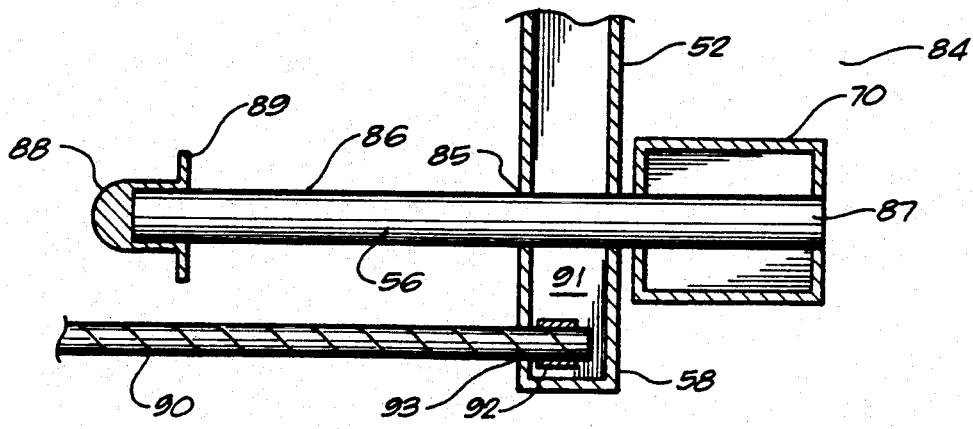
FIG. 6 is a detailed view, in cross-section, of the locking mechanism of the present invention.

FIG. 6 shows a detailed view of the configuration of the locking mechanism 84. Specifically, handle 52 has a hole 85 formed therethrough which receives the outer diameter 86 of axle member 56. End 87 of axle member 56 is rigidly fastened to frame portion 70. The axle member 56 can be welded, bolted, or otherwise rigidly fastened to the frame portion 70. The outer diameter 86 of axle member 56 forms a slide surface for the end 58 of handle 52. As such, the handle 52 is free to slide over the outer diameter 86 of axle member 56. A cap 88 is fastened to the far inward end of axle member 56. Cap 88 includes an abutment surface 89 which prevents further travel of handle 52 along slide surface 86 of axle member 56. The cord 90 is received by end 58 of handle 52. Cord 90, identified herein as a "pulling means", is fastened to the interior 81 of handle 52 by placing a crimping member 92 about the outer diameter of cord 90. Cord 90 extends from interior 91 through opening 93 at end 58 of handle 52.

This locking mechanism is unique to the present invention and further enhances the capabilities of the present invention. In particular, a simple downward motion on the cord 66 allows the handle to move from its first position to its second position. This can be done in a minimum of time. Additionally, the arrangement of the locking mechanism provides a rigid well-distributed structural support for the vertical position of the handles. This locking mechanism is placed on each end of the cart 10. It can be used for both handles.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A convertible cart for transporting objects comprising:
   a frame;
   a first handle connected to said frame adjacent one end of said frame;
   a second handle connected to said frame adjacent an opposite end of said frame from said first handle, each of said first and second handles selectively movable between a first position generally perpendicular to said frame and a second position generally aligned with said frame, said frame having a first stop member fastened to said frame adjacent said first handle, said frame having a second stop member fastened to said frame adjacent said second handle, said first and second stop members in abutment with said first and second handles when said handles are in said first position, said frame having a first axle member in engagement with said first handle, said frame having a second axle member in engagement with said second handle, said first handle rotatable between said first and second positions about said first axle member, said second handle rotatable between said first and second positions about said second axle member, said first and second axle members extending inwardly of said frame, said first handle slidable along a surface of said first axle member, said second handle slidable along a surface of said second axle member, each of said first and second handles having a U-shaped configuration, each of said first and second handles having a flexible cord connected to opposite ends of said U-shaped configuration, said cord connected to said U-shaped configuration so as to cause said handles to move along said surface of said first and second axle members;
   a pair of primary wheels attached to said opposite end of said frame, each of said pair of primary wheels positioned on opposite sides of said frame; and
   a second wheel attached to said one end of said frame, said primary wheels and said secondary wheel supporting said frame in a position generally parallel to a surface on which said primary wheels and said secondary wheel are placed.

2. The cart of claim 1, said frame comprising:
   a first U-shaped member; and
   a second U-shaped member slidably engaging said first U-shaped member, said first and second U-shaped members movable relative to each other for changing a length of said frame.

3. The cart of claim 2, further comprising:
   a locking member fastened to one of said first and second U-shaped members so as to selectively engage the other of said U-shaped members.

4. The cart of claim 3, said locking member comprising:
   a thumbnut threadedly fastened to one of said first and second U-shaped members on an underside surface of said frame, said thumbnut rotatable to a position in abutment with the other of said U-shaped members.

5. The cart of claim 1, said pair of primary wheels being pneumatic wheels, said second wheel having at least one pivotting caster wheel.

6. The cart of claim 5, said secondary wheel comprising first and second pivotting caster wheels, each of said first and second caster wheels having a lock fastened thereto, said lock for selectively preventing rotation of said wheels.

7. The cart of claim 1, further comprising:
a stair climber frame member fastened to an underside of said frame adjacent said primary wheels.

8. A convertible cart for transporting objects comprising:
a frame;
a first handle connected to said frame adjacent one end of said frame;
a second handle connected to said frame adjacent an opposite end of said frame from said firsts handle, said first handle selectively movable between a first position perpendicular to said frame and a second position generally coplanar with said frame, said frame having a first axle member in engagement with said first handle, said frame having a second axle member in engagement with said second handle, said first handle rotatable between said first and second positions about said first axle member, said second handle rotatable between said first and second positions about said second axle member, said firsts and second axle members extending inwardly of said frame, said first handle slidable along a surface of said first axle member, said second handle slidable along a surface of said second axle member, each of said first and second handles having a U-shaped configuration, each of said first and second handles having a flexible cord connected to opposite ends of said U-shaped configuration, said cord for causing a movement of said first and second handles along said axle members; and
a plurality of wheels connected to said frame so as to support said frame above a surface.

9. The cart of claim 8, said second handle movable between a first position perpendicular to said frame and a second position overlying said first handle in said second position, said second position of said second handle parallel to said frame.

10. A handle locking mechanism for a handle of a cart comprising:
a first axle member affixed to a frame of the cart, said handle rotatable about said first axle, said first axle member having a longitudinal slide surface thereon;
a first stop member fastened to said frame so as to abut a surface of said handle, said stop member abutting said handle for a distance less than the length of said slide surface;
pulling means connected to said handle so as to cause said handle to move along said slide surface of said first axle member, said handle movable to a position free of said stop member;
a second axle member affixed to an opposite side of said frame from said first axle member, said handle rotatable about said second axle member, said second axle member having a longitudinal slide surface thereon; and
a second stop member fastened to said opposite side of said frame so as to abut another surface of said handle, said second stop member abutting said surface of said handle for a distance less than a length of said slide surface of said second axle member, said pulling means connected to said handle so as to cause said handle to move along said slide surface of said second axle member, said handle movable to a position free of said second stop member, said handle having a U-shaped configuration, one end of said U-shaped configuration in rotatable relationship with said first axle member, another end of said U-shaped configuration in rotatable relationship with said second axle member, said pulling means connected to said ends of said U-shaped configuration so as to extend thereacross, said pulling means comprising a cord affixed to opposite ends of said handle, said cord positioned in proximity to said first and second axle members.

11. The mechanism of claim 10, further comprising:
a second axle member affixed to an opposite side of said frame from said first axle member, said handle rotatable about said second axle member, said second axle member having a longitudinal slide surface thereon;
a second stop member fastened to said opposite side of said frame so as to abut another surface of said handle, said second stop member abutting said surface of said handle for a distance less than a length of said slide surface of said second axle member, said pulling means connected to said handle so as to cause said handle to move along said slide surface of said second axle member, said handle movable to a position free of said second stop member.

* * * * *